United States Patent [19]

Nunn, Jr.

[11] 4,040,050
[45] Aug. 2, 1977

[54] EMERGENCY VEHICLE AUDIBLE WARNING SYSTEM

[76] Inventor: Ewing D. Nunn, Jr., 2900 Madison, Apartment B-32, Fullerton, Calif. 92631

[21] Appl. No.: 550,417

[22] Filed: Feb. 18, 1975

Related U.S. Application Data

[63] Continuation-in-part of Ser. No. 216,002, Jan. 7, 1972, Pat. No. 3,868,684.

[51] Int. Cl.² .................................................. G08B 3/00
[52] U.S. Cl. .................................... 340/384 E; 340/405
[58] Field of Search ............... 340/405, 384 E, 75, 340/88; 179/1 SA

[56] References Cited

U.S. PATENT DOCUMENTS

| 3,693,110 | 9/1972 | Briggs, Jr. et al. | 340/384 E |
| 3,747,092 | 7/1973 | Smith | 340/384 E |
| 3,868,684 | 2/1975 | Nunn, Jr. | 340/384 E |
| 3,873,980 | 3/1975 | Carroll | 340/384 E |
| 3,889,256 | 6/1975 | Cieslak et al. | 340/384 E |

*Primary Examiner*—Marshall M. Curtis
*Attorney, Agent, or Firm*—George Frazier Bethel; Patience K. Bethel

[57] ABSTRACT

An emergency vehicle audible warning system having a control circuit with a means for switching said control circuit to activate a tone generator for creating a yelp tone or a wail tone. A siren amplifier interfaces a siren speaker and the yelp and wail tone generators. A series of switches are also provided in operative connection with the horn ring of an automobile or a foot switch, so that the yelp or wail tone can be effectuated thereby, upon the demand of the driver of the emergency vehicle. The change from the yelp or wail tone can be provided by either a change in capacitance, or a change in the resistance within the tone generating circuit. In addition thereto, an extended yelp tone is provided by means of a timing circuit or increased time delay function to maintain a yelp tone or another desired tone for an extended period of time after either the horn switch, foot switch, or other appropriate switch has been momentarily activated and then released.

10 Claims, 3 Drawing Figures

EMERGENCY VEHICLE AUDIBLE WARNING SYSTEM

CITATION OF RELATED APPLICATION

This case is a continuation-in-part of my previously filed case for an emergency vehicle audible warning system, filed on Jan. 7, 1972, bearing Ser. No. 216,002 now U.S. Pat. No. 3,868,684.

FIELD OF THE INVENTION

The field of this invention lies within the audible warning tone generation art as it relates to emergency vehicles.

THE PRIOR ART

The prior art relating to the generation of audible warning tones for emergency vehicles, such as police, fire, and ambulance type vehicles, initially incorporated the use of a siren. The siren was generally activated by a switch and effectively created a sound which warned surrounding vehicles that an emergency vehicle was moving rapidly nearby.

As emergency vehicles were later developed, certain apparatus was incorporated in emergency vehicles such as radios, floodlights, and many other devices such as public address systems. As a consequence, various switching functions had to be developed to provide for the various accessories that were included with emergency vehicles. The state of the art was such that many of the devices had to be turned on and off in a separate manner until the U.S. patent to E. D. Nunn, Jr., numbered 3,262,096, the applicant herein. In that patent, a control system for emergency vehicles was disclosed which provided for the proper switching of the horn, siren, radio circuit and numerous other optional features in a single control unit. This effectively enabled the operator of an emergency vehicle to operate all the accessory equipment of an emergency vehicle through a single control source.

In the development of the single control unit, a switch was utilized for certain audible warning tones. One of the warning tones was a wail. The wail is effectuated by a slow rise and fall between the high and low tone ranges. The wail tone is substantially effective in certain areas. However, a yelp tone which provides a substantially distinguishable high to low tone with a much faster rise and fall of the tone is considered to be more effective in certain instances. The yelp tone has provided emergency vehicles with a superior capability of warning approaching automobiles in many cases that an emergency vehicle is about to pass. The wail tone often does not evoke as much human audible response at intersections and as a consequence, is not as effective as the yelp.

In order to effectively provide the yelp tone, it has been necessary to activate the yelp tone by means of manually turning a switch, such as that on the control unit. This switch is usually placed at a distal and impractical location from a driver. This effectively takes an emergency vehicle driver's hand off the wheel of the vehicle creating a dangerous situation. As a consequence, emergency vehicles until this invention have not had an effective audible warning system incorporating a yelp as opposed to a wail upon ready demand.

This invention enables one to incorporate a yelp tone over or between wail tones upon demand. The demand function is effectuated by use of the horn ring or any other accessible switch means which can be actively and easily switched on by the operator. For example, a foot switch can be utilized to generate the yelp tone over the wail tone. In operation, the system functions to create a yelp tone without deactivating the entire circuit by a unique switch function in the controlling unit and tone generating circuits.

In addition to the desirability of providing a yelp tone in lieu of a wail tone on demand, it is often desirable to maintain the yelp tone for a given period of time. In other words, when a yelp tone is actuated in order to supplant a wail tone, it is desirable to have it maintained for a prescribed period of time, such as during the time required to pass through an intersection. When the operator depresses a switch or a horn ring, it is oftentimes desirable to not only permit the yelp tone to be generated during the time in which the switch is actuated, but also during an extended period of time thereafter.

This invention enables one to incorporate a yelp tone, or any other suitable tone, over and between wail tones for an extended period of time by means of a timing circuit. The timing circuit can be in the form of a capacitor across a particular coil of a relay, or a specific timing circuit of any other particular type. The timing circuit allows for the activation of the yelp tone over an extended period of time, so that the driver of an emergency vehicle in passing through a dangerous situation such as an intersection, can momentarily depress a switch or a horn ring of an emergency vehicle and release the switch. After the switch or horn ring has been released, the timing circuit or timing capacitor of this invention enables a continuation of the yelp tone for a prescribed period, after which the yelp tone will stop and the wail tone, or other suitable alternate tone will revert back to its normal sequence.

SUMMARY OF THE INVENTION

In summation, this invention incorporates the new and novel combination of a horn ring, foot switch, or other suitable accessible switch means within the control and audible tone generating circuits of an emergency vehicle to provide a yelp tone over a wail tone upon demand, or for any extended period based upon the provision of a timing circuit, which creates the tone for such prescribed period.

Specifically, the invention utilizes a yelp and wail tone generator in combination with a switching relay such as a reed switch or a transistorized switching network to introduce or eliminate a capacitor or change of resistance, so that generation of a wail or yelp tone is provided. The switching relay is controlled by means of the horn ring of foot switch activating the switching relay, so that the respective wail or yelp tone generators in combination with the amplifier and siren speaker will create the yelp tone over the wail tone upon demand.

The wail and the yelp tones are respectively created by increased or decreased capacitance or a change in capacitance in the tone generator oscillator circuits. The tone switching relay or switching transistorized network takes the capacitance out of the circuit or varies the resistance, so that the wail cannot be generated by the tone generator, and in lieu thereof a yelp is created. The yelp tone created on demand over a wail tone is extremely valuable for warning oncoming vehicles at intersections and in other dangerous areas.

In foregoing change from a wail to a yelp tone can be provided with an extended feature by a timing circuit or increased capacitance across a relay coil to create an extended yelp tone. In other words, after momentarily pressing the switch function provided by the horn ring or switch of this invention, a yelp tone or other suitable tone can be provided for an extended, or increased prescribed period of time. This frees the driver, so that when a dangerous situation occurs, the yelp tone, which evokes greater response, is extended without the requirement of an operator constantly depressing of switching the horn ring or switch.

BRIEF DESCRIPTION OF THE DRAWINGS

The invention will be more clearly understood by reference to the description, taken in conjunction with the accompanying drawing wherein.

DESCRIPTION OF THE PREFERRED EMBODIMENTS

Apparatus for Practicing the Invention

Figure 1:
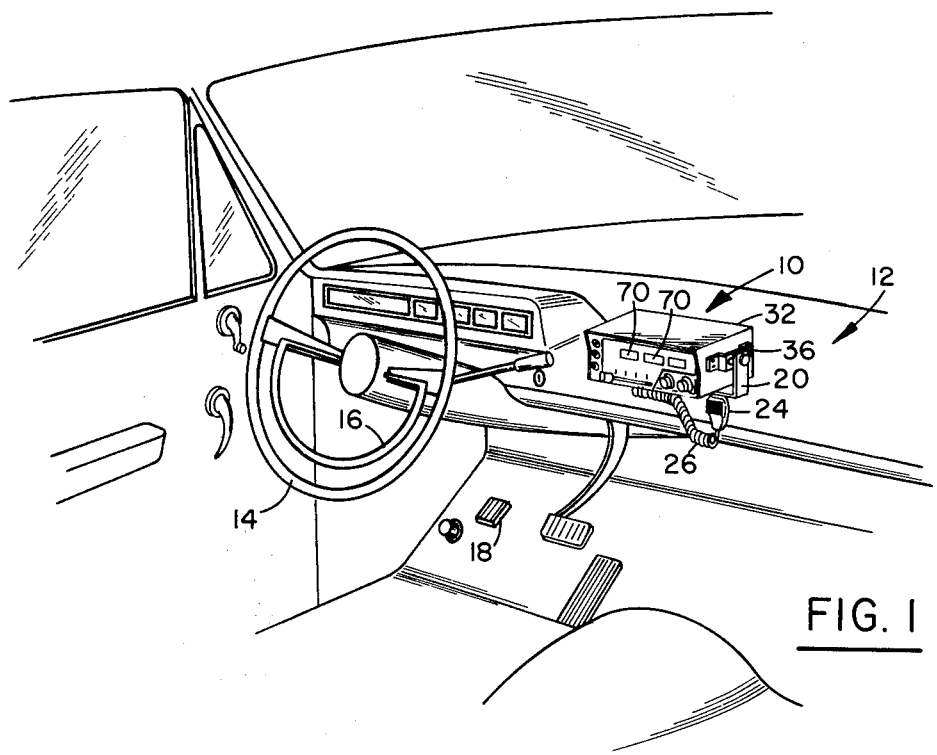
FIG. 1 shows a fragmented perspective view of the interior of an emergency vehicle utilizing the system of this invention.
Figure 2:
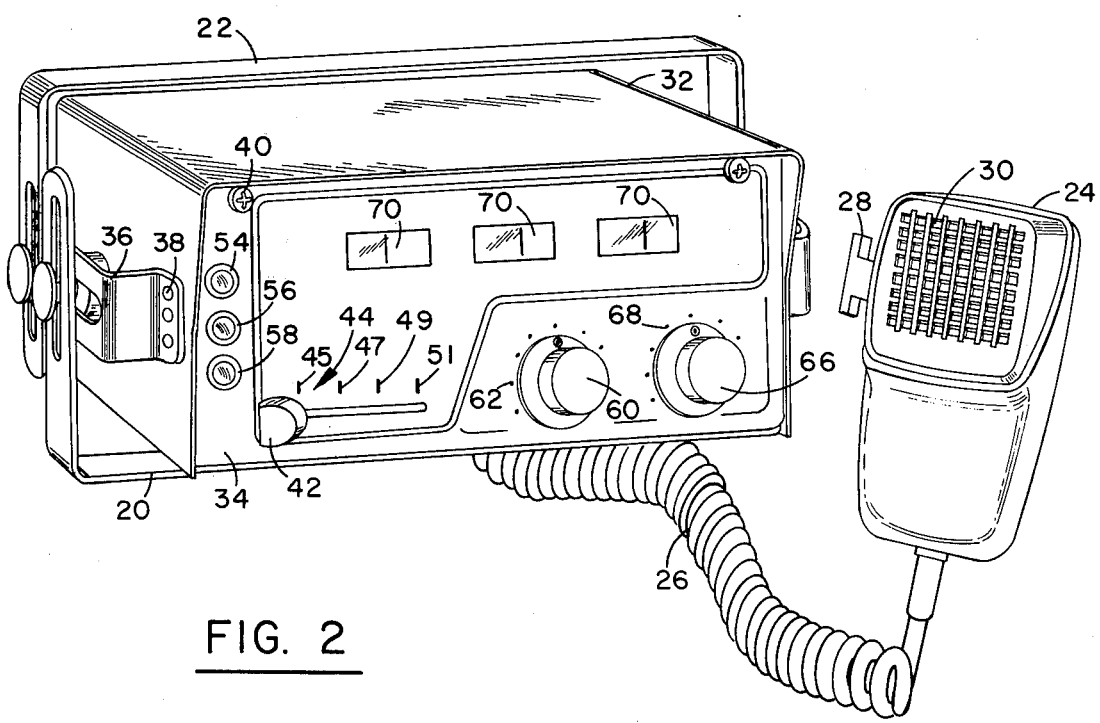
FIG. 2 is a perspective view of the control system shown in FIG. 1 in greater detail from the left side thereof; and, FIG. 3 is a block and line diagram showing the functioning elements of the system in cooperative relationship.

FIGS. 1 and 2 show a control console 10. The control console 10 is mounted on the dashboard 12 of an emergency vehicle having a steering wheel 14 and a horn ring 16. The vehicle can also be equipped with a foot switch 18 for purposes of operating different components of the invention. The emergency vehicle interior shown in FIG. 1 is otherwise of a standard type similar to that of any emergency vehicle such as an ambulance, fire engine, or police car.

The control console unit 10 has a mounting bracket 20 upon which the device can be mounted with an overbracket 22 for purposes of holding the contol console more securely in place. A microphone 24 is shown having a lead 26 into the control console for purposes of providing a public address capability for the emergency vehicle. The microphone 24 has the normal state of the art pushbutton 28 and microphone grid 30.

The console 10 has a case 32 in which the components are mounted and a face plate 34 for purposes of identifying the different functions which the console controls. As can be seen, the console 10 is mounted to the bracket 20 by means of a U bracket 36 with rivets 38. However, any other suitable attachment means can be utilized. The face plate 34 is secured to the console unit 32 by means of Phillips head screws 40 or any other suitable means 40.

The control console has a master switch 42 which in part serves the function of an audible warning control switch. The switch makes contact by swinging across a wiper plate 82 interiorly of the console. The master switch 42 serves to control a series of functions for the emergency vehicle as indicated by the scribe lines positioned at points 45, 47, 49 and 51. The switch indicates and operates the respective functions of an emergency vehicle such as its flood lights, siren, warning light, or any other particular operative features peculiar to an emergency vehicle. The console 10, but not necessarily through the master switch 42 can coordinate the lights, flashing brake lights, locks, or headlights. The console 10 can also be utilized with the vehicle's horn ring to make audible sounds, as will be described.

Alongside the edge regions of the console 10 and face plate 34 are a series of indicator lights 54, 56 and 58. The indicator lights indicate at a glance what equipment is operating and what is being controlled by the master switch 42 and the other switches of the console. The indicator lights can be color coded so that the entire device effectively can be monitored by a visual glance to show which respective accessories of an emergency vehicle are operating.

A selector switch 60 is provided to serve in part the function of a tone control switch. The switch 60 can select the audible warning accessories of an emergency vehicle to determine which particular sounds will be made. For instance, the selector switch 60 has different positions generally shown by the dots 62 to turn on the siren for a respective wail tone, yelp tone, high-low tone or manual operation of the siren. The switch 60 can also turn on the radio as well as provide other functions. Thus, the switch 60 controls the operation of the emergency vehicle equipment in a more discrete manner than the master switch 42 which broadly selects the accessories to be operated.

The switch 60 can also have discrete switch locations which provide multiple functions such that by depressing another switch or horn ring, it will cause selective override functions, or the extended yelp tone of this invention. For instance, the utilization of a wail tone by means of placing the switch 60 into the wail position can be provided with an extended yelp tone, which is created when the horn ring or foot switch is depressed. In this manner, the extended yelp tone can be created for a period of time when the switch 60 is placed in the same position as the wail tone.

A second rotary switch 66 is provided having a series of dots or selection points 68 which provide positions for operating a radio, the microphone 24, or other similar accessories.

A number of rocker switches 70 can be provided on the face plate 34 to cause the different accessories of an emergency vehicle to function. For instance, the switches 70 can be utilized to operate an electric trunk lid, floodlights, or interior lights. The rocker switches 70 can also be utilized to provide a shotgun rack release or brake light cutoffs as well as many other options which are useful for an emergency vehicle.

Figure 3:
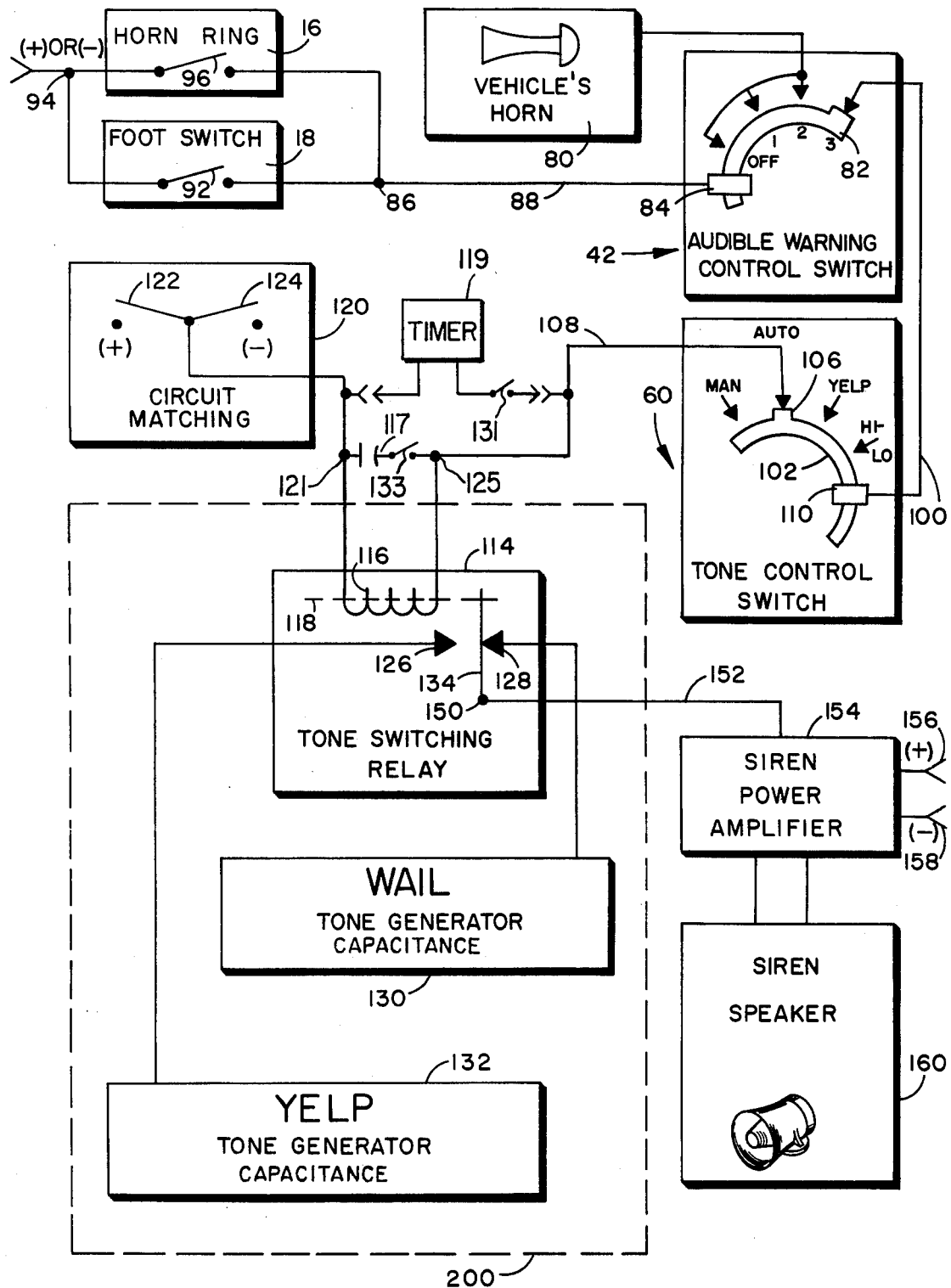

Looking more specifically at FIG. 3, which shows the line and block diagram of this invention, the two previously discussed switches are shown. Specifically, the selector switch 60 and master switch 42 are shown. For purposes of identification means, the master switch 42 and selector switch 60 have been reduced to a limited function of an audible warning control switch and a tone control switch.

When the audible warning control switch 42 is turned to position 3 thereof, it serves to connect the audible tone generator which will be described. Position 2 of the audible warning control switch leads to the emergency vehicle's horn 80. Position 1 connects the lighting system of the vehicle or for that matter, could be used to connect any other suitable accessory of the emergency vehicle.

The audible warning control switch 42 has a wiper plate 82 with a junction contact point 84. The contact point 84 leads to a junction 86 by means of connection 88. Junction point 86 is connected to the horn ring 16 and the foot switch 18 through the power supply or battery 94 of the emergency vehicle. The horn ring 16 is effectively a contact switch 96 which is operated by the horn ring when it is depressed. The foot switch 18 is also a contact switch 92. Both switches place the operative features of this invention in an on or off condition depending upon whether they have been respectively actuated.

The audible warning control switch 42 is connected through wiper plate 82 to a lead 100 which in turn is connected to the tone control switch 60. The tone control switch 60 is provided with a wiper plate 102 and has the respectively designated contacts, namely, man (manual), auto (automatic), yelp and hi-lo (high-low). A contact 110 on the wiper plate 102 connects it to lead 100. As can be seen, the tone control switch 60 has been positioned at contact 106 which is the position for operating the auto (automatic) portion of the siren and leads to line 108. Thus, the tone control switch 60 is connected respectively to the horn ring 16 and foot switch 18.

Line 108 is connected to a tone switching relay 114 which can be in the form of a reed switch or any other suitable relay. In the instant embodiment, it is preferred to utilize a reed switch because of the size and configuration of the circuitboard within the control console 32. The relay can comprise a coil 116 having a core 118. The coil 116 is connected through to ground with respect to the appropriate polarity of the circuit by a circuit matching switch 120 having respective positive or negative connection points 122 and 124. The switch 120 serves to match the horn ring or the foot switch to the automobile circuit, and other portions of the console 10.

The tone switching relay 114 creates a circuit through its junction point 150 by means of connecting the remainder of the circuit to either connection points 126 or 128.

The tone switching relay 114 can be replaced with a solid state circuit, such as a transistor switching network, or in some cases, a single transistor. In other words, the tone switching relay 114 can be comprised of any suitable switch means, so long as there is ample power to operate the switch. Thus, any switching transistor network or other elements can be utilized to create a switching or connection between contacts 126 and 128.

Within the console 10 and mounted on a circuit panel or board 200 is a tone generator preamplifier to provide a wail tone 130. A second tone generator preamplifier provides a yelp tone 132. The wail and yelp tone generators respectively 130 and 132 are incorporated with other circuitry which has been disclosed in such publications as the Unitrol Catalogs of Dunbar Nunn Corporation of 1108 Raymond Way, Anaheim, Calf., as well as the previously cited patent to Ewing D. Nunn, Jr.

The wail tone generator and the yelp tone generator preamplifiers 130 and 132 respectively provide signals to create either a rise or fall in tone at a moderate frequency or a rise from low tones to high tones at a substantially greater frequency.

In order to provide an extended time delay or the yelp tone of this invention, a capacitor 117 has been placed across the terminals 121 and 124. The capacitor 117 can be substituted by means of a timing network 119 placed across similar terminals to those designated 121 and 124.

The purpose of the timing network is to provide an extended yelp tone. In other words, when the horn ring or foot switch 96 and 92 are depressed, they actuate the tone switching relay 114, or a switch such as a transistorized switching network. This activates a switching function, so that the terminal 126 is connected to the yelp tone generator preamplifier. The yelp tone generator preamplifier 132 would normally be disconnected upon the opening of the horn ring switch 96, or the foot switch 92. However, when a charge is built up on the capacitor 117, it provides a continued source of energization to the coil 116 of the tone switching relay 114, which holds it closed. This effectuates a continued or extended yelp for that period of time in which it is closed. In like manner, the timer 119 can provide the holding function to a solid state transistorized switching network, or any other switching means.

Regardless of how the timing is provided, whether it be by capacitance, such as capacitor 117 maintaining a certain amount of current within the coil 116 prior to its electrical field collapsing, or any other means, the provision of an extended yelp tone over the wail tone is provided for. This enables an emergency vehicle operator to depress the horn ring 96 or foot switch 92, and remove his hand or foot therefrom. Afterwards, the yelp tone will continue for a pre-established period of time, depending upon the capacitance of capacitor 117 and, of course, the other attendant electrical characteristics of the circuit, or the pre-established time function provided by the timer 119.

The difference between the wail tone and the yelp tone as far as the wail tone being generated with the preamplifier 130 and the yelp tone being generated with the preamplifier 132, is generally a function of differences in capacity. In other words, a wail tone usually requires more capacitance within its oscillator circuit in order to create its rise and fall between its high and low tones. To the contrary, the yelp tone requires less capacitance. Thus, the schematic blocks 130 and 132 of the tone generating circuit 200 can be merely capacitive elements within the entire circuit. The tone can then be modified by changing the capacitance which is then required for the respective wail tones and yelp tones by switching the two logic elements 130 and 132 in and out of the tone generating circuit 200.

However, it has been found that in lieu of changes of capacitance between the yelp preamplifier 132 and the wail preamplifier 130, a change in resistance can be effectuated. In other words, by virtue of providing a switching between different resistance within the r/c network provided by the wail and yelp tone generator preamplifiers respectively 130 and 132, changes in tone can be effectuated in a similar manner as changes in capacitance.

Switches 131 and 133 or a switch position on switch 60, can serve to isolate the timing functions respectively of the timer 119 and capacitor 117. This provides a variance to the system so that the yelp tone can be provided on an extended or demand basis.

The tone switching relay 114 is connected at the relay junction point 150 to line 152 which leads to a siren power amplifier 154. The siren power amplifier 154 is powered through connection points 156 and 158. The siren power amplifier increases the overall power of the signal to allow a siren speaker 160 to send forth either the wail or the yelp tone in accordance with the position of the tone switching relay 114 as dictated by the horn ring 16 or foot switch 18.

OPERATION OF THE SYSTEM

As the operator of an emergency vehicle drives, it is common to turn on the siren on an automatic basis to warn oncoming vehicles of the possibility of colliding with the fast moving emergency vehicle. This is accomplished by placing the audible warning control switch 42 into position 3. The operator also places the tone control switch 60 in a position whereby it is in the auto position. The audible warning control switch 42 or master switch can now activate the entire system of this invention.

In this particular mode, the wail tone generator preamplifier 130 is connected through the tone switching relay 114 by means of contact 128. The tone which is generated through the siren speaker 160 in this mode is that of a wail. As previously discussed, moderate frequency from low tone to a high tone in an oscillatory manner, characterizes the wail.

Assuming that the operator of the emergency vehicle is approaching an intersection or other particularly dangerous location, the operator will want to attract attention by providing a yelp tone which is a rapidly pulsating low to high tone. In order to effectuate the yelp tone, the operator presses either the horn ring 16 or the foot switch 18 thereby closing contacts 96 and 92 respectively. At this moment in time, current passes for purposes of activating the tone switching relay 114.

When the tone switching relay 114 is activated, the core 118 pulls the arm 134 to contact 126 to create a yelp tone. In the preferred embodiment, the tone switching relay 114 eliminates a capacitor which is the circuit enclosed within dotted lines or mounted on the circuit board 200 of the console 10. Thus, the yelp tone generator preamplifier 132 can be created by displacement of a capacitor within the entire siren tone circuit. This effectively causes a rapid rise and fall or yelp because the oscillator of the tone generator circuit cannot create the required duration of energy storage through its capacitance as required for a wail tone.

The extended yelp function of this invention utilizes either the capacitor 117 or timer 119. By pressing the horn ring 96, or foot switch 92, the tone switching relay 114 or transistorized switching network, is placed in a functioning position for an extended period of time. In other words, depending upon the amount of voltage built up on the capacitor 117, or the pre-established timing function of the timer 119, the tone switching relay 114, or switching network, will remain closed for a given period of time. At this point, the operator in this particular mode is provided with an extended yelp tone so that he is free to drive a vehicle after merely touching a foot switch or horn ring. This frees an operator's hands to provide other functions, or allows him to drive a vehicle in a safe manner.

In addition to the foregoing changes in capacitance as previously indicated, a change in resistance can be effectuated through the switching network of this invention. This, of course, changes the basic resistorcapacitor network with regard to an oscillator, so that differences of resistance provided differences in duration of the r/c function. The change of resistance to provide for a different r/c function creates a situation wherein the overall effect provides a yelp tone as opposed to a wail.

It should be understood that other configurations and modes embodied in the teaching of this invention can be utilized. For instance, other means of placing the capacitor of the wail tone generator in an on-line or off-line position for the effective yelp tone can be utilized. Furthermore, completely separate circuits can be utilized to create the tones with respect to each other. Also, different switching functions can replace the audible warning control switch 42, tone control switch, horn ring, and the foot switch. Thus, the foregoing described invention is only to be read and construed in light of the following claims.

I claim:

1. An improved audible warning system in combination with an emergency vehicle comprising:
   a tone generating circuit for generating a signal to provide a first siren sound from a low to high pitch at a prescribed frequency between the low and high pitch in the form of a wail tone;
   a siren speaker operatively connected to said tone generating circuit;
   a suitable power supply for operating the system;
   capacitance means within said tone generating circuit to effectuate the prescribed frequency between the high and low pitch;
   switch means connected to said capacitance means to eliminate at least a portion of said capacitance in said tone generating circuit to create a tone signal between the high and low pitch at a greater frequency than the prescribed frequency of the first tone in the form of a yelp tone when said switch means is actuated by the horn switch of an automobile; and,
   timing means for maintaining the switch means in operative position to create the greater frequency between the high and low pitch for a prescribed period of time.

2. The system as claimed in claim 1 wherein said switch means comprises at least in part:
   a relay.

3. The system as claimed in claim 2 wherein said timing means comprises:
   a capacitance means placed across the coil of said relay to provide a pre-established buildup of voltage on said capacitor to create an extended electrical field on said coil prior to its collapse.

4. The system as claimed in claim 2 wherein:
   said timing means comprises a timing network; and,
   said switch means comprises a transistorized switching network.

5. The system as claimed in claim 3 wherein said relay comprises:
   a reed relay.

6. An improved audible warning system in combination with an emergency vehicle comprising:
   a tone generating circuit for generating a signal to provide a first siren sound from a low to high pitch at a prescribed frequency between the low and high pitch in the form of a wail tone;
   a siren speaker operatively connected to said tone generating circuit;
   a suitable power supply for operating the system;
   capacitance means within said generating circuit to effectuate the prescribed frequency between the high and low pitch;
   switch means connected to said capacitance means to eliminate at least a portion of said capacitance in said tone generating circuit to create a tone signal between the high and low pitch at a greater frequency than the prescribed frequency of the first tone in the form of a yelp tone when said switch means is actuated by a foot switch; and, timing means for maintaining the switch means in operative position to create the greater frequency between the high and low pitch for a prescribed period of time.

7. The system as claimed in claim 6 wherein said switch means comprises at least in part:
a relay.

8. The system as claimed in claim 7 wherein said timing means comprises:
a capacitance means placed across the coil of said relay to provide a pre-established buildup of voltage on said capacitor for an extended period of time to create an extended electrical field on said coil prior to its collapse.

9. The system as claimed in claim 7 wherein:
said timing means comprises a timing network; and,
said switch means comprises a transistorized switching network.

10. The system as claimed in claim 7 wherein said relay comprises:
a reed relay.

* * * * *